United States Patent [19]

Leiboff

[11] 4,155,649
[45] May 22, 1979

[54] RADIANT ENERGY DETECTION SYSTEM
[75] Inventor: Teague N. Leiboff, Redondo Beach, Calif.
[73] Assignee: Northrop Corporation, Los Angeles, Calif.
[21] Appl. No.: 878,988
[22] Filed: Feb. 17, 1978
[51] Int. Cl.² ............................................. G01B 11/26
[52] U.S. Cl. ................................. 356/141; 343/113 R
[58] Field of Search .............................. 356/141, 152; 250/203 R, 342; 343/113 R, 113 PT, 120

[56] References Cited
U.S. PATENT DOCUMENTS

| 2,764,755 | 9/1956 | Aiken et al. | 343/113 R |
| 2,962,715 | 11/1960 | Byatt | 343/120 |
| 3,037,121 | 5/1962 | Collison | 250/203 R |
| 3,268,185 | 8/1966 | Eckermann, Jr. | 250/203 R |
| 3,478,219 | 11/1969 | Nutz | 250/203 R |
| 3,493,765 | 2/1970 | Kelly et al. | 250/203 R |
| 3,687,556 | 8/1972 | Price et al. | 356/141 |
| 3,719,424 | 3/1973 | Weischedel | 250/209 |
| 3,943,360 | 3/1976 | Parkin | 356/152 |
| 4,006,356 | 2/1977 | Johnson et al. | 250/203 R |

Primary Examiner—S. C. Buczinski
Attorney, Agent, or Firm—Edward A. Sokolski

[57] ABSTRACT

A radiant energy detection system includes a first and second pairs of radiation detectors, the detectors of each pair facing in opposite directions to each other, the first and second pairs being positioned in a mutually orthogonal relationship. The detectors may be joined together in a cube structure which is fixedly mounted on a support. A chopper mechanism is mounted over the detectors; this chopper mechanism being supported on a motor shaft for rotatable drive thereby around the detector assembly. The signals arriving at the detectors from a radiant energy source are chopped by the chopper to produce a periodically varying output signal from each of the detectors. the outputs from each detector pair are fed to a separate differencing amplifier which generates a signal in accordance with the difference therebetween; the outputs of the amplifiers being phase demodulated to provide signals having peak amplitudes representing the cosine and the sine respectively of the angle of the radiant energy source (target) from the detector assembly. The signal in accordance with the sine of the angle, and the signal in accordance with the cosine of the angle, are fed to an analog processor which generates output signals in accordance with the azimuth angle of the target, the angular quadrant in which it lies, and a signal which appears at the time maximum energy is being received by the detectors.

8 Claims, 21 Drawing Figures

RADIANT ENERGY DETECTION SYSTEM

This invention relates to radiant energy detectors, and more particularly to a device which employs first and second pairs of orthogonally oriented detectors, the outputs of which are processed to provide a signal in accordance with the azimuth angle of the target.

Radiant energy detection systems are used extensively for the passive detection of targets to provide an output signal in accordance with the angular position of the target relative to the detector assembly. Such devices are particularly useful in detecting military targets and in the guidance of vehicles in aircraft missile and space navigation. Typical prior art systems of this type are described in U.S. Pat. Nos. 3,719,424, 3,230,376 and 3,162,764. These prior art systems generally have the disadvantage of being overcomplicated in their construction. Further, many of these devices are not adapted to a compact and rugged construction, as is required in a ground portable installation of the type contemplated for the present invention.

The present invention is an improvement over prior art radiation detector systems which is particulary suitable for use in detecting ground targets, such as tanks or other ground vehicles, in a portable field installation. The simplicity and durability of its construction and its compact size make the present invention particularly suitable for use in such field installations, as will be apparent from the following description.

Further, the system of the present invention employs a unique processing approach which operates in conjunction with two pairs of detectors, one of these pairs being utilized to generate a signal in accordance with the cosine of the target angle, the other of these pairs being used to generate a signal in accordance with the sine of the target angle. The processor then uses these two signals to produce signals in accordance with the target angle, the quadrant in which the target angle is located, and the time of arrival of the peak signal from the target.

It is therefore an object of this invention to provide an improved radiant energy detection system which is of greater simplicity, smaller size and ruggedness of construction.

It is still another object of this invention to provide an improved radiant detection system particularly suitable for portable ground installations in the field.

Other objects of this invention will become apparent as the description proceeds in connection with the accompanying drawings, of which:

Figure 5:
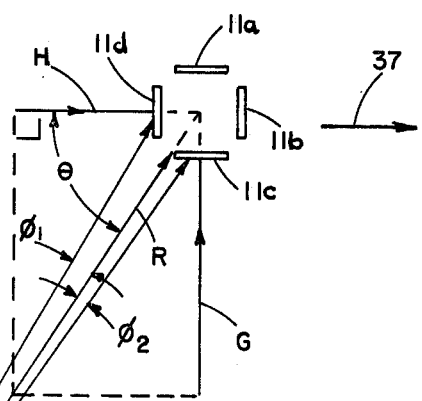

FIGS. 4A-J are a series of waveforms illustrating the operation of the preferred embodiment;

FIG. 5 is a schematic drawing illustrating how the target angle signal is generated; and FIGS. 6A-G are a series of waveforms illustrating the operation of the system of the invention in detecting a moving target.

Briefly described, my invention is as follows: A first and second pair of radiant energy detectors are mounted in a cube shaped assembly, detectors of each pair facing in opposite directions to each other, the first pair being oriented orthogonally to the second pair. The detector assembly is supported on a support assembly which is adapted to be staked into the ground. A compartment is provided in the support assembly for housing the electronics necessary for implementing the detection functions. A motor is also mounted on the support structure, this motor being used to rotatably drive a chopper in the form of a shutter assembly which surrounds the detector assembly. The outputs of each pair of detectors are fed to a separate differential amplifier, each of the difference signals thus developed being phase-demodulated. The outputs of the phase demodulators are differentiated to provide DC signals in accordance with the sine and cosine respectively of the angle of the target relative to the detector assembly. The signals in accordance with the sine and cosine of the azimuth of the target angle are fed to an appropriate processor which generates output signals in accordance with the azimuth angle, the quadrant in which the target is located and the time of arrival of the peak signal from the target.

Figure 1:
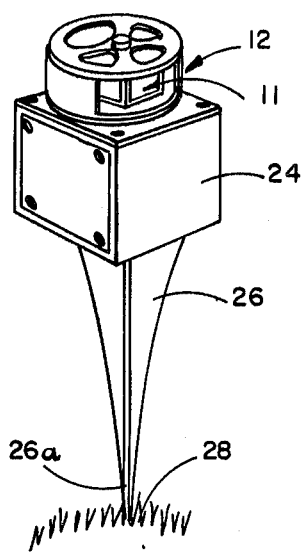
FIG. 1 is a perspective view of a preferred embodiment of the invention shown in a field installation.
Figure 2:
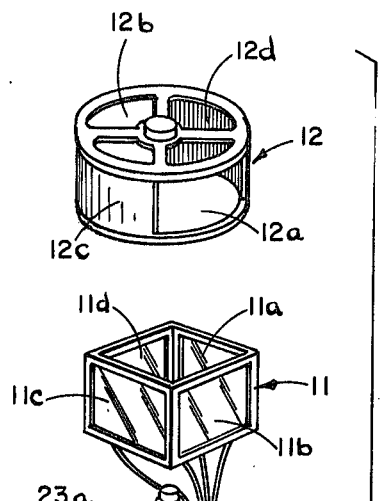
FIG. 2 is an exploded view of the preferred embodiment.

Referring now to FIGS. 1 and 2, a preferred embodiment of the invention is illustrated. Detector assembly 11 is in the general shape of a cube and includes a first pair of oppositely positioned detector units 11a and 11c, and a second pair of oppositely positioned detector units 11b and 11d, the sensing surfaces of the pairs being oriented in mutually orthogonal relationship. Detector assembly 11 is fixedly mounted on casing 24. The detector units 11a-11d may be pyro-electric detectors such as those commercially available from such companies as Honeywell Corporation or Barnes Engineering Company.

Mounted in casing 24 is the electronic circuitry to be described in connection with FIG. 3, and a drive motor, the shaft 23a of which is shown protruding upwardly from the casing. Fixedly attached to motor drive shaft 23a for rotation therewith is chopper assembly 12. Chopper assembly 12 includes a pair of oppositely positioned apertures 12a and 12b, these apertures each covering approximately 90° of arc of the cylindrical sidewall of the chopper. Apertures 12a and 12b are separated from each other by shutter portions 12c and 12d. Casing 24 is supported on post 26 which has a spiked end 26a for use in mounting the entire assembly in the ground 28.

In operation, drive shaft 23a drives chopper assembly 12 at a rotation rate of the order of 2 Hz to effectively periodically "chop" the radiant energy received by detectors 11a-11d from radiation energy sources in the vicinity. The detectors thus provide electrical outputs in accordance with the radiant energy incident thereon as modulated by the action of the chopper. The device can be made rather small in size, a typical dimension being of the order of 1" cubed for casing 24.

Figure 3:
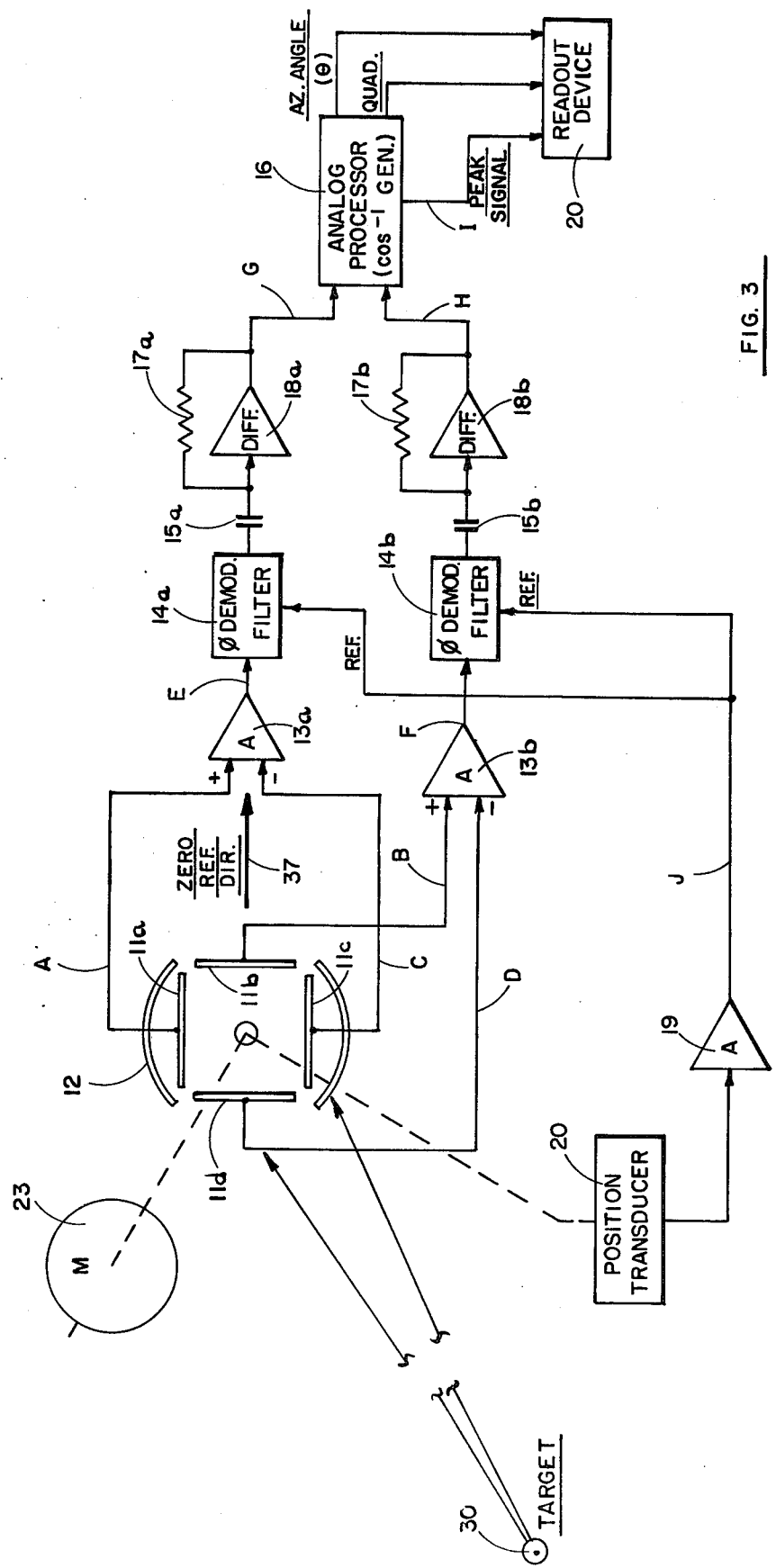
FIG. 3 is a schematic drawing illustrating the circuitry employed in the preferred embodiment.
Figure 4:
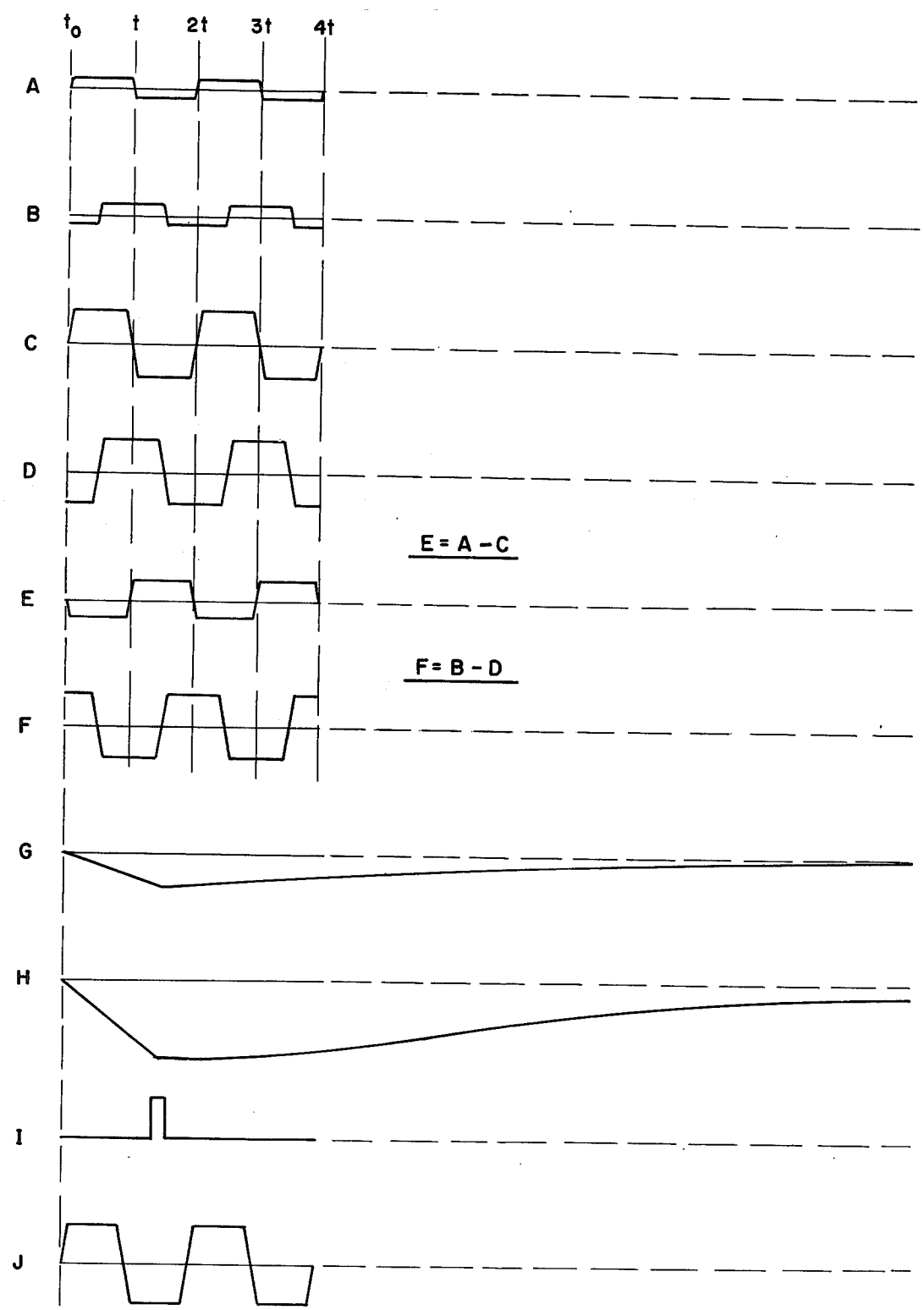
Figure 6:
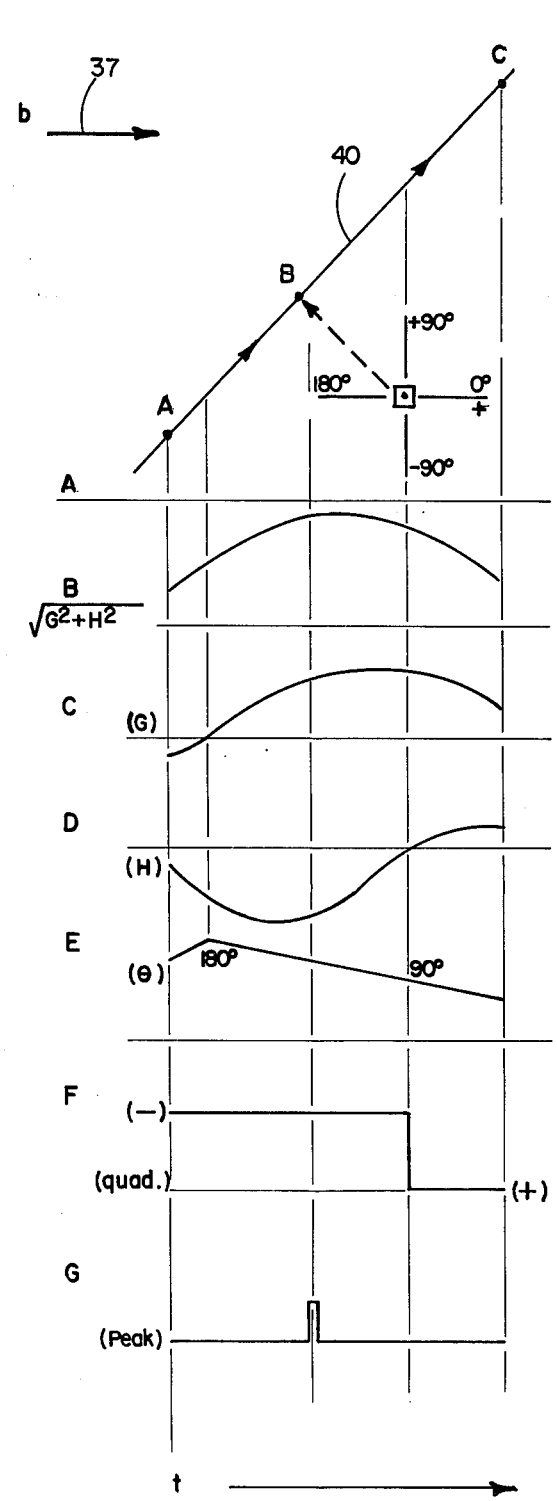

Referring now to FIGS. 3 and 4, the preferred embodiment is schematically illustrated in FIG. 3 in connection with the waveform diagrams of FIG. 4. The signals "A-F" shown in the corresponding lettered lines of A-J of FIG. 4 are indicated at their points of appearance in FIG. 3. For purposes of illustration, a radiant energy target 30 is shown at a particular angular relationship to detector assembly 11, the waveforms of FIG. 4 resulting from a target in this particular position. Motor 23 rotatably drives chopper assembly 12 slowly around detector assembly 11, as already noted at a rate of the order of 2 Hz. Position transducer 20, which may comprise a position pickoff of the potentiometer or induction type, is coupled to the drive shaft 23a of motor 23 and rotates therewith. The output of position transducer 20 is fed to amplifier 19 which is biased to be driven to saturation so as to flatten the peaks of the generally sinusoidal output of the transducer. The output, "J" of amplifier 19 is illustrated in FIG. 4J and provides a reference signal for phase demodulators/filters 14a and 14b.

The outputs "B" and "D" of detectors 11b and 11d respectively are fed in opposite polarity relationship to amplifier 13b, the output "F" of this amplifier representing B−D. The outputs "A" and "C" of detectors 11a and 11c respectively are fed in opposite polarity relationship to amplifier 13a, the output "E" of this amplifier representing A−C. Position transducer 20 has a zero reference direction, as indicated by arrow 37. Signals E and F are phase demodulated in phase demodulators 14a and 14b to produce DC signals having amplitudes representing the sine and cosine of the angular relationship of target 30 to the detector assembly 11, as referenced from the zero reference direction indicated by arrow 37.

The outputs of the phase demodulators and filters 14a and 14b are differentiated in the differentiation circuits which include capacitor 15a, resistor 17a and amplifier 18a, and capacitor 15b, resistor 17b and amplifier 18b respectively. Typically, the RC time constants of these circuits are of the order of 5 seconds. This results in output signals from amplifiers 18a and 18b respectively as shown in "G" and "H" of FIG. 4. These wave shapes are based on the assumption that target 30 has appeared instantaneously. It is to be noted that in view of the fact that target 30 appears in the third quadrant, both "G", which represents the sine of the angle, and "H" which represents the cosine of the angle, are negative. The signals "G" and "H" drop fairly rapidly to their maximum negative values which represent the sine and cosine respectively of the target angle, and then decay towards zero.

The outputs of amplifiers 18a and 18b are fed to analog processor 16, wherein a signal in accordance with the cosine of the azimuth angle, and from this signal, signals in accordance with the azimuth angle and the quadrant (taken from the zero reference direction) in which the target lies are developed. The analog processor also provides a signal, "T" indicating the time of appearance of the vectorial resultant of the peak sine (G) and cosine (H) signals. This peak signal is used to provide an indication as to the time when the target passes closest to the detectors as an aid in gunnery control. The output of analog processor 16 is fed to readout device 20 which may comprise suitable indicators for the various parameter.

Referring now to FIG. 5, the development of the azimuth angle signal in the processor of the invention is schematically illustrated. It can be seen that the vectorial resultant R of the sine (G) and cosine (H) signals can be represented as follows:

$$R^2 \cong G^2 + H^2$$

where the angle $\theta >> \phi_1$ & $\phi_2$ and $$R \cong \sqrt{G^2 + H^2}$$

therefore, $$\theta = \cos^{-1} \frac{H}{\sqrt{G^2 + H^2}}$$

The target azimuth angle from the zero reference direction 37 for the illustrative example is equal to $180° + \theta$. Thus, it can be seen that any ambiguity as to the azimuth of the target for any cosine and sine signals can readily be resolved by taking a reading of the polarities of the sine and cosine signals. In this instance, in view of the fact that both these signals are negative, the position of the target is unambiguously identified as being in the third trigonometric quadrant.

Referring now to FIGS. 6A–6G, the operation of the system of the invention in the detection of a moving target is illustrated. The target track 40 is shown relative to the detectors 11. Lines C and D show the values of the sine (G) and cosine (H) signals respectively for the various positions of the target relative to the detectors (as shown in Line A). Line B shows the computed values of $\sqrt{G^2 + H^2}$ for the various target positions, while Line E represents the azimuth angle (O) of FIG. 5. Line F shows the "quadrant" signal which as can be seen is negative when the target is in the second and third quadrants and goes positive when the target is in the first quadrant (for the cosine signal). Line G shows a pulse generated when the resultant of the sine and cosine signals ($\sqrt{G^2 + H^2}$) shown in Line B reaches a peak value. This occurs at point "B" on the track whereat the target is closest to the detectors.

While the device of the invention has been described and illustrated in detail, it is to be clearly understood that this is intended by way of illustration and example only, and is not to be taken by way of limitation, the spirit and scope of this invention being limited only by the terms of the following claims.

I claim:

1. A radiant energy detection system for providing an indication of the azimuth angle of a radiant energy emitting target from said system comprising:

a first pair of radiation detectors positioned opposite each other with their sensing surfaces facing in opposite directions, a second pair of radiation detectors positioned opposite each other with their sensing surfaces in opposite directions and in an orientation substantially orthogonal to the sensing surfaces of said first pair of detectors, support means for supporting said detectors in a fixed position, a chopper device surrounding said detectors, said chopper device being rotatably mounted on said support means, means for rotatably driving said chopper device about said detectors to chop the radiant energy received thereby such that the outputs of said first and second pairs of detectors represent the sine and cosine of the angular position of the target from said detectors, first differencing means for receiving the outputs of said first pair of detectors and generating a signal in accordance with the difference therebetween, second differencing means for receiving the outputs of said second pair of detectors and generating a signal in accordance with the difference therebetween, analog processor means for receiving the outputs of said differencing means and generating therefrom a first signal representing the angle of said target relative to the detectors and a second signal representing the quadrant in which said angle is located, and readout means for providing a reading of the signals generated by the analog processor means.

2. The system of claim 1 wherein said detectors are assembled together in the form of a cube.

3. The system of claim 1 wherein said chopper device has a cylindrical side wall portion, a pair of oppositely positioned apertures each covering approximately 90° of arc being formed in said side wall portion.

4. The system of claim 1 wherein said support means comprises a casing, said first and second differencing means and said analog processor means being contained in said casing.

5. The system of claim 4 wherein the means for rotatably driving the chopper device comprises a motor mounted in said casing.

6. The system of claim 5 and further including a post extending from said casing, said post having a spike at one end thereof for mounting the casing in the ground.

7. The system of claim 1 wherein said first and second differencing means comprise differential amplifiers.

8. The system of claim 1 wherein said analog processor means is further adapted to generate a third signal at the time when the vectorial resultant of the outputs of said first and second pairs of detectors reaches a maximum value.

* * * * *